United States Patent [19]

Lindsay

[11] Patent Number: 4,790,512

[45] Date of Patent: Dec. 13, 1988

[54] REMOTELY OPERABLE HERMETICALLY SEALED PLUG VALVE

[75] Inventor: Malcolm Lindsay, O'Hara Township, Allegheny County, Pa.

[73] Assignee: Westinghouse Electric Corp., Pittsburgh, Pa.

[21] Appl. No.: 124,322

[22] Filed: Nov. 23, 1987

[51] Int. Cl.$^4$ .................. F16K 31/06; F16K 31/528
[52] U.S. Cl. .................. 251/129.2; 251/229; 251/252; 251/129.1
[58] Field of Search .................. 251/129.2, 215, 229, 251/252, 129.1

[56] References Cited

U.S. PATENT DOCUMENTS

| 1,765,377 | 6/1930 | Marks .................. 251/129.2 |
| 2,037,844 | 4/1936 | Wright et al. . |
| 2,201,782 | 5/1940 | McCollum . |
| 3,184,214 | 5/1965 | King .................. 251/252 X |
| 3,319,925 | 5/1967 | Kojima et al. . |
| 3,339,582 | 9/1967 | Karas . |
| 3,870,275 | 3/1975 | Kallel .................. 251/215 X |
| 4,195,666 | 4/1980 | Goetz et al. . |
| 4,221,238 | 9/1980 | Madsen . |
| 4,241,897 | 12/1980 | Maezawa . |
| 4,350,322 | 9/1982 | Mueller .................. 251/252 X |
| 4,530,486 | 7/1985 | Rusnak . |
| 4,556,195 | 12/1985 | Calkins . |
| 4,632,361 | 12/1986 | Callison . |

Primary Examiner—Arnold Rosenthal
Attorney, Agent, or Firm—Jon F. Merz

[57] ABSTRACT

A hermetically sealed, remotely operable plug valve has a plug that moves between a seated and unseated position in a housing. A cam and cam follower cause the plug to rotate as it moves up and down in the housing. The plug has a transverse opening which interconnects the inlet and outlet for opening and closing the valve when the plug reciprocates between the seated and unseated positions. A solenoid external to the housing drives the plug up and down.

12 Claims, 4 Drawing Sheets

REMOTELY OPERABLE HERMETICALLY SEALED PLUG VALVE

BACKGROUND OF THE INVENTION

The invention relates to valves useful in harsh environments. In particular the invention relates to hermetically sealed plug valves which are remotely operable.

A major problem with valves that are used in harsh environments in which corrosive or toxic fluids or gas are circulated, is that packed glands or seals for the valve actuator can leak and allow circulated fluid or gas to escape to the environment. A need exists, therefore, for a valve that will preclude the possibility of loss of the circulated fluid. It is also desirable to have the capability to remotely sense the condition of the valve and to remotely operate the valve in harsh environments where access to the valve is restricted.

One technique for insuring that a valve is hermetic or leak-proof is to enclose the actuator and gland within a cover which is welded to the valve body. While this technique is effective, access to the valve actuator is restricted. Other less restrictive techniques may involve a compromise of the integrity of the seal. When remote monitoring and control of the valve is desired, either the seal integrity is compromised or the system is necessarily complex. For example, a remote control technique involving the use of a magnetically driven valve actuator located within the valve body or housing is shown in Goetz et al., U.S. Pat. No. 4,195,666. The arrangement in Goetz et al. is complex and has moving parts susceptible to failure in a corrosive environment. The need therefore exists for a simple, reliable and uncompromised hermetically sealed and remotely controllable valve for use in a toxic or corrosive environment.

SUMMARY OF THE INVENTION

In accordance with the present invention, a remotely operable, hermetically sealed magnetically actuated plug valve comprises a housing having a fluid inlet and a fluid outlet, and a plug seat in flow communication therebetween. A plug is rotatably and reciprocally mounted in the plug seat about and along an axis between open and closed positions. The plug has a through opening for interconnecting the inlet and outlet for flow communication therethrough when in the open position, and for blocking flow communication between the inlet and outlet when it is closed. A magnetic actuator is sealed within the housing for reciprocally driving the plug axially within the plug seat between the seated and unseated positions in response to a magnetic actuating force. The plug is normally at rest in the seated position and assumes either one of the open and closed positions when at rest. A circumferential cam and a cam follower engaging the cam operatively couple the plug and the plug seat for urging the plug to rotate about the axis between the open and closed positions as the actuator drives the plug reciprocally along the axis through a cycle beginning and ending at rest in the seated position and through the unseated position. A solenoid operating externally of the housing produces the magnetic actuating force.

DESCRIPTION OF THE PREFERRED EMBODIMENT

Figure 1:
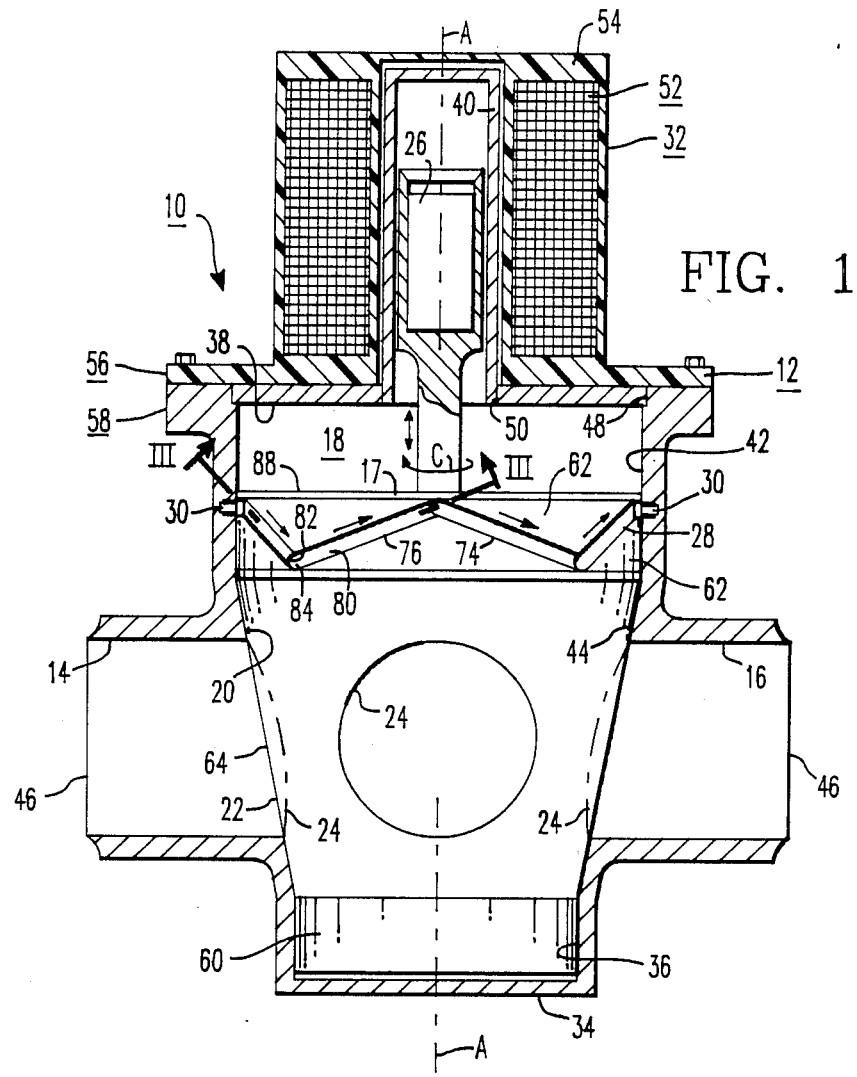
FIG. 1 is a partially sectioned side elevation of a plug valve in accordance with the present invention, in which the through opening in the plug is illustrated in the closed position in solid lines and in the open position in phantom.
Figure 3:
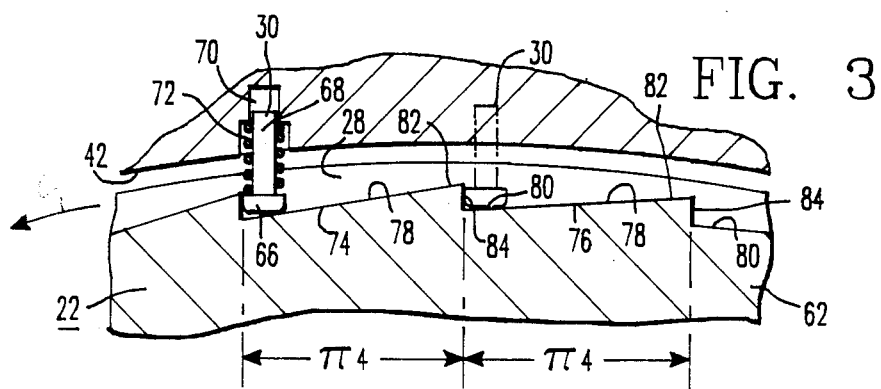
FIG. 3 is a sectional view with parts broken away of a portion of the plug valve taken along line III—III of FIG. 1.
Figure 2:
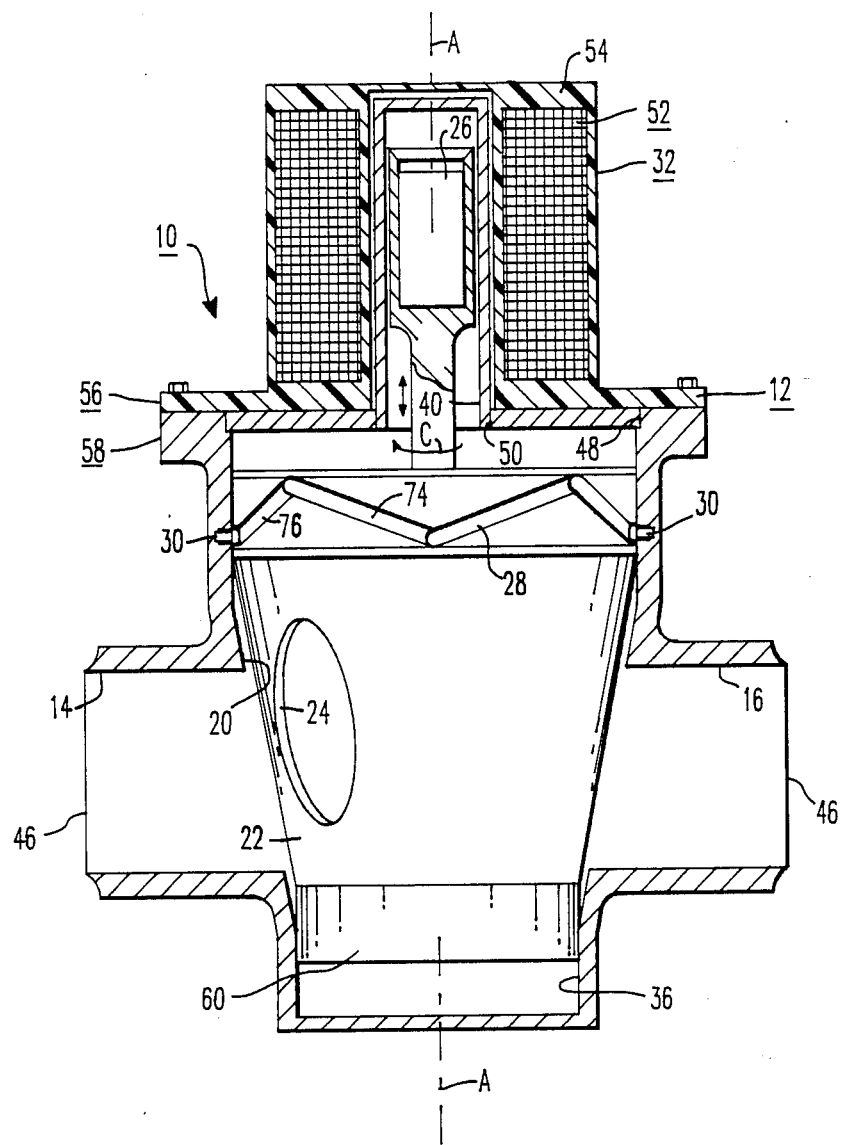
FIG. 2 is similar to FIG. 1 except that the plug is shown in an unseated and partially rotated position between the open and closed positions.

An exemplary embodiment of a plug valve 10 of the present invention is illustrated in FIGS. 1-3. The valve 10 includes a housing 12 having a fluid inlet 14, fluid outlet 16, and a chamber 18 formed with a plug seat 20 interconnecting the inlet 14 and the outlet 16. A plug 22 is rotatably and reciprocally mounted in the chamber 18 of the housing 12 about an axis A between respective open and closed positions. In FIG. 1 the plug 22 is shown in solid line with an opening 24 transverse of the housing 12 in the closed position. In the phantom view in FIG. 1 the opening 24 is shown in the open position. The opening 24 interconnects the inlet 14 and the outlet 16 in flow communication when the plug 22 is in the open position. The plug 22 blocks flow communication therebetween when the plug 22 is in the closed position as shown.

A magnetic actuator 26 (referred to hereinafter as actuator 26) is attached to an upper end 17 of the plug 22 and is sealed within the housing 12 (as shown). The actuator 26 reciprocally drives the plug 22 axially within the chamber 18 between a seated position (FIG. 1) and an unseated position (FIG. 2) in response to a magnetic actuating force.

A circumferential cam slot 28 (hereinafter cam 28) and at least one cam follower 30, engaging the cam 28, operatively interconnects the plug 22 and the plug seat 20 for urging the plug 22 to rotate about the axis A between the respective open and closed positions as the actuator 26 drives the plug 22 through a cycle from the seated position (FIG. 1) through the unseated position (FIG. 2) and back to the seated position.

Electromagnetic drive means 32 (referred to hereinafter as solenoid 32) operating externally of the housing 12 produces the magnetic actuating force for driving the actuator 26 and lifting the plug 22 to the unseated position. The solenoid 32 also provides the force for urging the plug 22 back to the seated position.

In the embodiment illustrated in FIG. 1, the housing 12 includes a bottom wall 34 and an upstanding centrally located lower cylindrical portion or lower cylinder 36 extending upwardly therefrom. The housing 12 further includes a top wall 38 spaced from and opposing the bottom wall 34. The top wall 38 has a centrally located upwardly extending cylindrical portion or top cylinder 40 which is concentric with the axis A. The top cylinder 40 is adapted to receive the actuator 26 therein as shown. The housing 12 further includes a centrally located upper cylindrical portion 42 or upper cylinder 42 depending from the top wall 38. The upper cylinder 42 and the lower cylinder 36 are concentric with the axis A. The respective upper and lower cylinders 42 and 36 are interconnected by an intermediate tapered portion 44 forming the seat 20. The inlet 14 and the outlet 16 are interconnected with and extend from the tapered portion 44 as shown. The inlet 14 and the outlet 16 may be interconnected with external piping (not shown) by means of a weld along seam 46 or by means of a flange (not shown). The top wall 38 fits within a flanged opening 48 in the upper portion of the housing 12. The top wall 38 may be welded in place as shown in order to hermetically seal the chamber 18. The top cylinder 40 may be integrally formed with the top wall 38 or welded as shown in an aperture 50 therein.

The solenoid 32 illustrated schematically in FIGS. 1 and 2 includes an electromagnetic coil or winding 52 and a frame 54 external of the top wall 38 and top cylinder 40. A lower portion of the frame 54 has a circular flange 56 which confronts a corresponding flange 58 at the opening 48 in the upper portion of the housing 12. The confronting flanges 56 and 58 may be welded together along the peripheral edge or bolted together as shown. The solenoid 32 may be a push-pull device having a compound or polarized winding 52 which is operative, when energized to a first condition, to draw the actuator 26 upwardly in the top cylinder 40, and which is operative when energized to second condition to drive the actuator 26 downwardly in the top cylinder 40. In the embodiment shown, the solenoid 32 operates externally of the housing so that the hermetic seal thereof is uncompromised.

Plug 22 has a lower cylindrical portion 60 and upper cylindrical portion 62 and an intermediate tapered portion 64. The plug 22 is fitted within the chamber 18 so that the lower cylindrical portion 60 slidably fits within the lower cylinder 36 and the upper cylindrical portion 62 slidably fits within the upper cylinder 42. The intermediate tapered portion 64 closely conforms with tapered portion 44 of the seat 20. In the view illustrated in FIG. 1, the plug valve 10 is closed because the opening 24 is transverse to the direction of fluid flow from the inlet 14 to the outlet 16 and the plug 22 in the seated position blocks the inlet 14 and the outlet 16.

The cam 28 is formed as a sawtooth groove in the upper cylindrical portion 62 (FIG. 1). The cam follower 30 has a head 66 and a tail 68 (FIG. 3). A recess 70 in the side wall of the upper cylinder 42 receives the tail 68 of the cam follower 30. A spring 72 biases the head 66 of the cam follower 30 radially inward toward the plug 22.

The cam 28 in the upper cylindrical portion 62 of the plug 22 is in the form of an interconnected sawtooth or a zig-zag of downward grooves 74 and upward grooves 76. Referring to FIG. 3, each downward groove 74 and each upward groove 76 has a slanted floor portion 78 which confronts the head 66 of the cam follower 30 as shown. The slanted floor 78 has a low end 80 and an interconnected high end 82. The high end 82 of the downward groove 74 and the low end 80 of the upward groove 76 are separated or offset from each other by a ledge 84. When, as hereinafter described, the plug 22 rotates about the axis A in the direction of the circular arrow C (FIGS. 1 and 3) the cam 28 and cam follower 30 move relative to each other and the head 66 slides along the floor 78. The cam follower 30 is thereby urged radially away from the axis A until it reaches the high end 82 of the floor 78. As the plug 22 moves further, the ledge 84 moves past the head 66 and the cam follower 30 drops into the low end 80 of the next succeeding groove, which in the case shown in FIG. 3 is the upward groove 76. Thus, in accordance with the embodiment illustrated in FIGS. 1-3, the plug 22 may rotate in the direction C (clockwise viewed from the top in FIG. 1 and to the left in FIG. 3). The ledge 84 blocks backward or counter-clockwise motion of the plug 22.

The actuator 26 is rigidly interconnected with the plug 22 as shown in FIG. 1. When the actuator 26 moves upwardly in the top cylinder 40, the plug 22 is caused to rotate as a result of the camming action of the cam 28 with respect to the cam follower 30. The solenoid 32 may be a push-pull device known to those skilled in the art which is configured to drive the actuator 26 up or down, depending upon the polarity of the incoming current or the configuration of the winding 52 (e.g. stacked or concentric coils, not shown).

In operation, when the solenoid 32 is energized the actuator 26 is drawn upwardly in the top cylinder 40, thereby drawing the plug 22 upwardly in the chamber 18. The lower cylinder 36 cooperating with the lower cylindrical member 60, and the upper cylinder 42 cooperating with the upper cylindrical member 62, maintain the plug 22 in alignment with the axis A. As the plug 22 moves from the seated position shown in FIG. 1 to the unseated position shown in FIG. 3, the cam follower 30 cooperating with the cam 28 causes the plug 22 to rotate clockwise. In the position shown in FIG. 2, the plug 22 has been lifted upwardly along axis A and rotated approximately 45 degrees to the position shown. With respect to FIG. 3, the cam follower 30 (shown in phantom) and the cam 28 have moved with respect to each other so that the head 66 is located at the low end 80 of the upward groove 76. The solenoid 32 may then be appropriately energized to drive the actuator 26 downwardly in the top cylinder 40, causing the plug 22 to continue to rotate in the clockwise direction, with the cam follower 30 following the upward groove 76 over the next ledge 84 (FIG. 3) so that the plug 22 is driven into the seated position with the opening 24 aligned with the inlet 14 and the outlet 16. The valve 10 is thus in the open position. In order to re-close the valve 10, the actuator 26 is drawn upwardly by appropriate energization of the solenoid 32 and then driven downwardly by appropriate energization of the solenoid 32 whereby the plug 22 moves through a cycle from a seated position (FIG. 1) through an unseated position (FIG. 2) and then back to the seated position.

Figure 4:
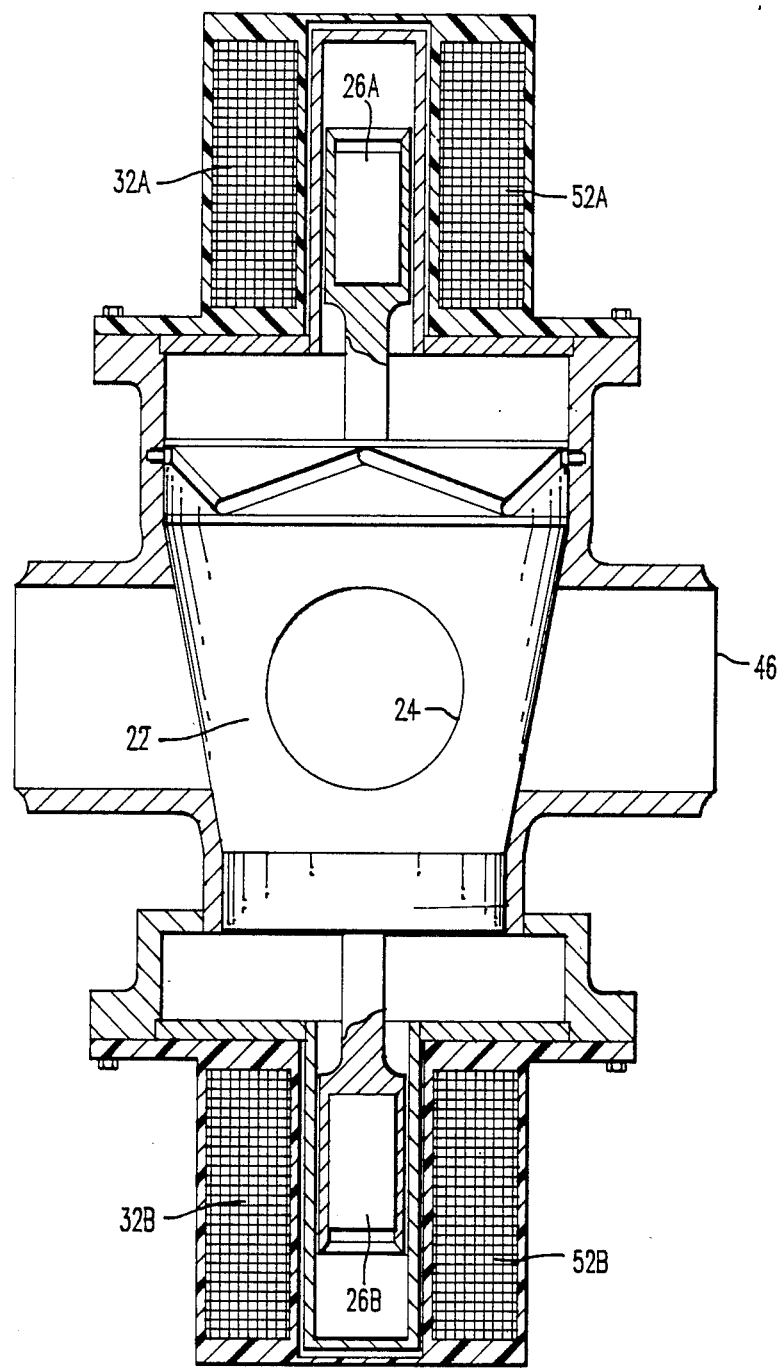
FIG. 4 is a partially sectioned side elevation of another embodiment of the plug valve of the present invention in which a pair of solenoids operate at opposite ends of the plug.

It is possible in alternative embodiments of the present invention to provide a pair of solenoids 32A and 32B in an arrangement such as that illustrated in FIG. 4. In such an arrangement, solenoid 32A draws actuator 26A and the interconnected plug 22 in the upward direction, and solenoid 32B draws the actuator 26B and the interconnected plug 22 in the downward direction to complete a cycle between seated and unseated positions.

Figure 5:
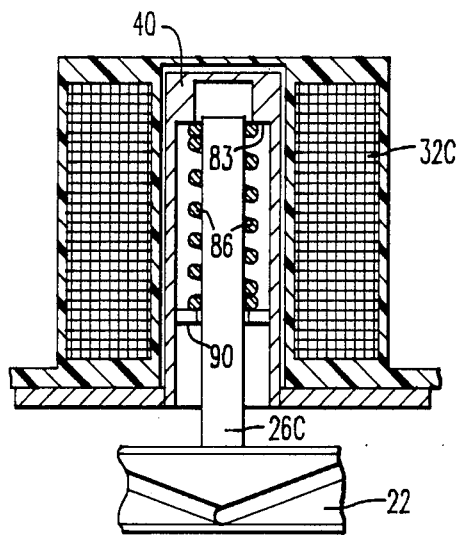
FIG. 5 is a partially sectioned fragmentary side elevation of an actuator which is spring biased

In FIG. 5, a fragmentary view of an actuator 26C is shown in which a spring 86, captured between ledge 88 in top cylinder 40 and retainer 90 secured to the actuator 26C, biases the actuator 26C in a downward direction. The solenoid 32C, when energized, draws the actuator 26C upwardly so that the plug 22 is unseated in a manner similar to the illustration in FIG. 2. When the solenoid 32C is deactivated, the spring 86 drives the actuator 26C downwardly causing the plug 22 to move into the seated position similar to the illustration in FIG. 1, at which time the valve 10 may be either open or closed.

Figure 6:
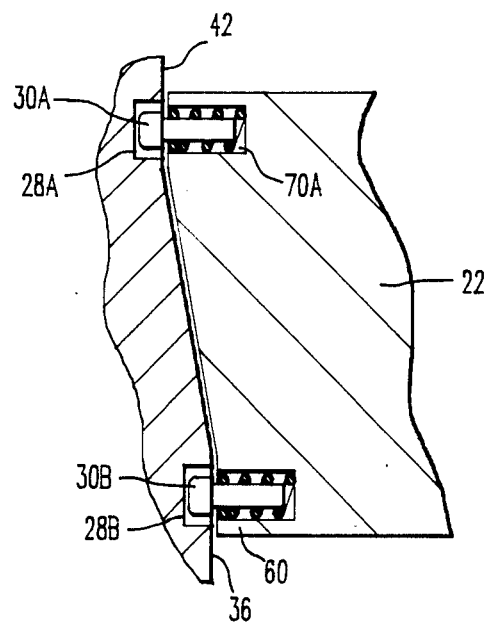
FIG. 6 is a fragmentary schematic illustration of another embodiment of the cam and cam follower in which the cam is formed in a side wall of the valve housing and the cam follower is mounted in a recess in the wall of the plug.

In FIG. 6, an alternative of the invention is illustrated in which the cam follower 30A is located in a recess 70A in plug 22 and the cam 28A is formed in the wall of the upper cylindrical portion 42. It is also possible to provide a cam 28B and cam follower 30B between the lower cylindrical portion 36 and lower cylinder 60 in any of the alternative forms referred to above or in combination therewith.

A cap or retainer ring 88 (FIGS. 1 and 2) may be located atop the plug 22. When removed, the retainer ring 88 provides access to the cam follower 30 so that it may be easily retracted by means of an appropriate tool (not shown) for removing the plug 22 from the housing 12 when servicing is necessary.

It can be readily appreciated that the hermetically sealed plug valve 10 of the present invention may take a variety of forms including an arrangement in which the plug 22 is a right circular cylinder and wherein a plurality of cams 28 are provided. It should be further appreciated that because the housing 12 may be welded shut, the entire valve 10 may be hermetically sealed to assure that corrosive and toxic fluid may not readily escape. It should be further understood that, if desired, the valve 10 may be sealed by means of O rings.

The arrangement of the present invention readily lends itself to remote operation and sensing because the solenoids 32, 32A-32B and 32C (FIG. 1) may be readily actuated from a remote location. Further, depending upon the position of the actuators 26, 26A-26B and 26C in the respective solenoids 32, 32A-32B and 32C, the inductance thereof may vary so that the position of the plug 22, and hence the condition of the valve 10, may be remotely sensed. For example, in FIG. 1, the relative position of the actuator 26 within winding 52 will affect the inductance of the winding 52. The inductance may be readily sensed from a remote location to determine whether the plug 22 within the chamber 18 is in the seated or unseated positions. The various alternative embodiments may be similarly sensed.

While the invention has been described in connection with specific embodiments thereof, it will be understood that it is capable of further modifications. The claims are intended to cover any variations, uses or adaptations of the invention following, in general, the principles of the invention, and including such departures from the present disclosure as come within known and customary practice within the art to which the invention pertains.

I claim as my invention:

1. A hermetically sealed valve adapted to be placed in flow communication with a fluid line, comprising:
   a housing having a fluid inlet and a fluid outlet and an intermediate chamber in flow communication therewith forming a flow path through the valve, said housing adapted to be hermetically coupled in flow communication with the fluid line, said housing including a pair of spaced concentric cylindrical surfaces and an interconnecting valve seat;
   a plug being positionable in the chamber of the housing in operative relationship with the fluid inlet and fluid outlet between open and closed positions, said plug having a through opening therein for opening the flow path from the inlet to the outlet when in the open position and for blocking the flow path when in the closed position, said plug further including a pair of cylindrical spaced members mating with the cylindrical surfaces in the housing and an interconnecting portion mating with the valve seat, said plug being free to both unidirectionally rotate and reciprocate in the housing respectively about a concentric common axis of the cylindrical surfaces;
   an actuator axially interconnected with the plug for axially reciprocating the plug between seated and unseated positions; and
   a cam and cam follower cooperating with at least one of the cylindrical surfaces and a corresponding one of the cylindrical members for guiding said plug between the open and closed positions of the plug, said cam guiding the plug from rest in the open or closed position to open or close the flow path when the drive is actuated from rest at the seated position through the unseated position and back to the seated position, whereby axial movement of the drive causes simultaneous rotational and axial movement of the plug between open and closed positions.

2. The valve of claim 1, wherein the housing has a bottom wall, a top wall having an aperture therein and an upstanding top cylinder formed centrally therein for reciprocally receiving the actuator therein, electromagnetic means operating concentrically about the top cylinder for reciprocally moving the actuator in the top cylinder to first and second positions corresponding to the seated and unseated positions of the plug.

3. The valve of claim 2, wherein the electromagnetic drive comprises an electrical coil surrounding the top cylinder.

4. The valve of claim 1, wherein the cam comprises an interconnected sawtooth groove formed in at least one of the cylindrical surfaces and the cylindrical members, said sawtooth groove having respective upward and downward groove portions for causing the plug to rotate about the axis as the plug moves relative to the housing, each upward and downward groove including a radially facing floor adapted to be in abutment with the cam follower, said floor having a relatively low end and a relatively higher end in end-to-end configuration with an interconnecting ledge therebetween for causing the cam follower to move in only one direction.

5. The valve of claim 1, wherein the chamber includes opposed top and bottom walls, at least one of which includes an outwardly extending cylindrical portion, and wherein the actuator includes at least one electromagnetically responsive means engaging the cylinder along the axis and being reciprocable therein.

6. The valve of claim 1, wherein the actuator includes a spring biased cylinder interconnected with the plug for biasing the plug to the open or to the closed position.

7. The valve of claim 2, wherein the electromagnetic drive means comprises a solenoid having two actuable states, one for driving the plug to the unseated position and one for driving the plug to the seated position.

8. The valve of claim 2, wherein the valve housing is welded closed and the electromagnetic drive operates through the closed chamber for driving the plug between seated and unseated positions.

9. The valve of claim 1, wherein the actuator is remotely sensible and actuable.

10. The valve of claim 1, wherein the cam follower is a spring loaded pin mounted in an opening in at least one of the plug and the housing.

11. The valve of claim 1, wherein the plug comprises a body having spaced cylindrical portions and intermediate tapered portion, the tapered portion having an opening therein transverse to the axis of the plug.

12. A hermetically sealed magnetically operated plug valve comprising a housing having a fluid inlet and a fluid outlet and a plug seat in flow communication therebetween, a plug rotatably and reciprocally mounted in the plug seat about and along an axis between open and closed positions, said plug having a through opening for interconnecting the inlet and the outlet for flow communication therethrough when in the open position and for blocking flow communication between the inlet and the outlet when in the closed position, magnetic actuator means sealed within the housing for reciprocally driving the plug axially within the plug seat between a seated and an unseated position in response to a magnetic actuating force, said plug being normally at rest in the seated position and assuming either one of the open and closed positions when at rest; and a circumferential cam and a cam follower engaging the cam operatively connecting the plug in the plug seat for urging the plug to rotate about the axis between the open and closed positions as the actuator drives the plug reciprocally through a cycle beginning and ending at rest in the seated position through the unseated position, and electromagnetic drive means operating externally of the housing for producing said magnetic actuating force.

* * * * *